Figure 1:
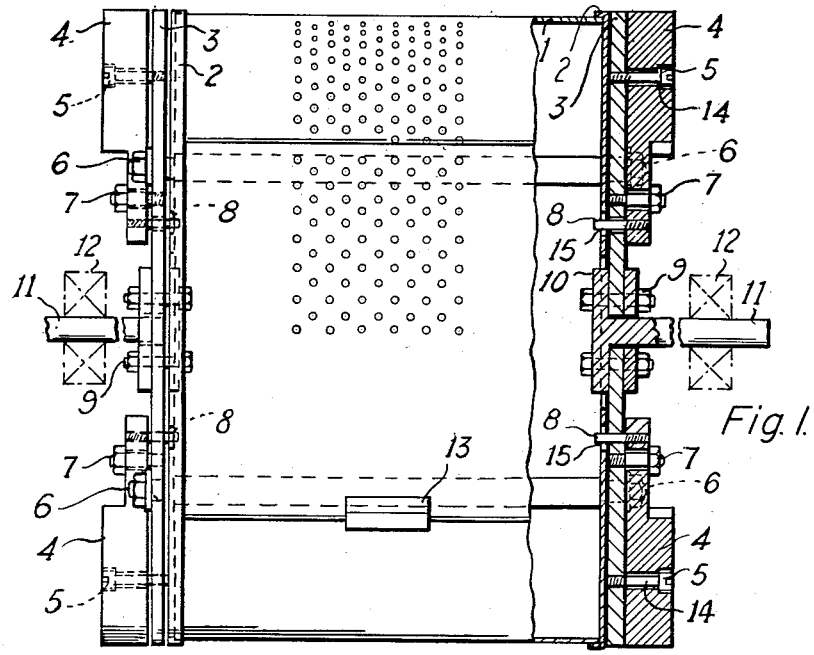

Dec. 13, 1960  W. BROUGH ET AL  2,963,921
MEANS FOR MOUNTING A MEMBER FOR ROTATION
Filed July 1, 1958  2 Sheets-Sheet 1

Inventors
WILLIAM BROUGH
JOSEPH SEYMOUR THOMPSON
By Toulmin & Toulmin
Attorneys

Dec. 13, 1960   W. BROUGH ET AL   2,963,921
MEANS FOR MOUNTING A MEMBER FOR ROTATION
Filed July 1, 1958   2 Sheets-Sheet 2
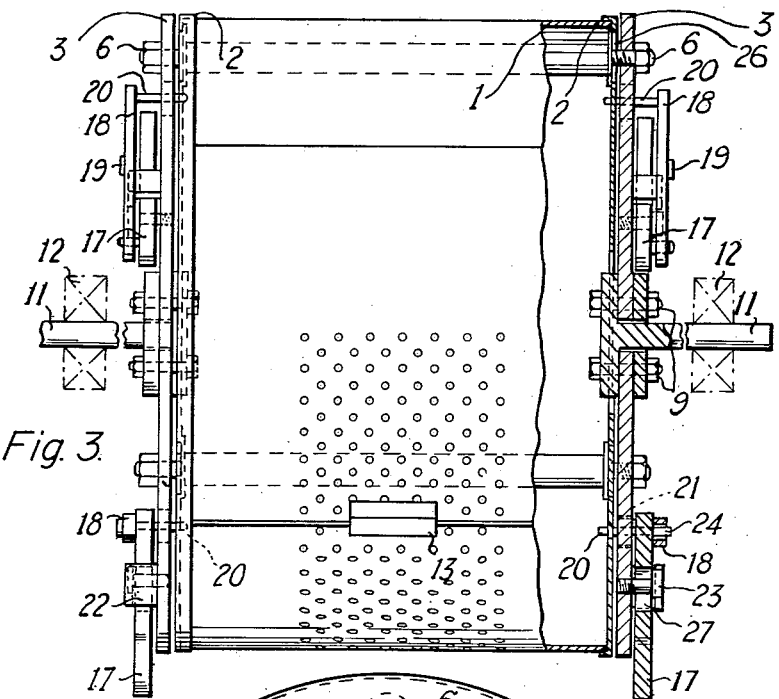
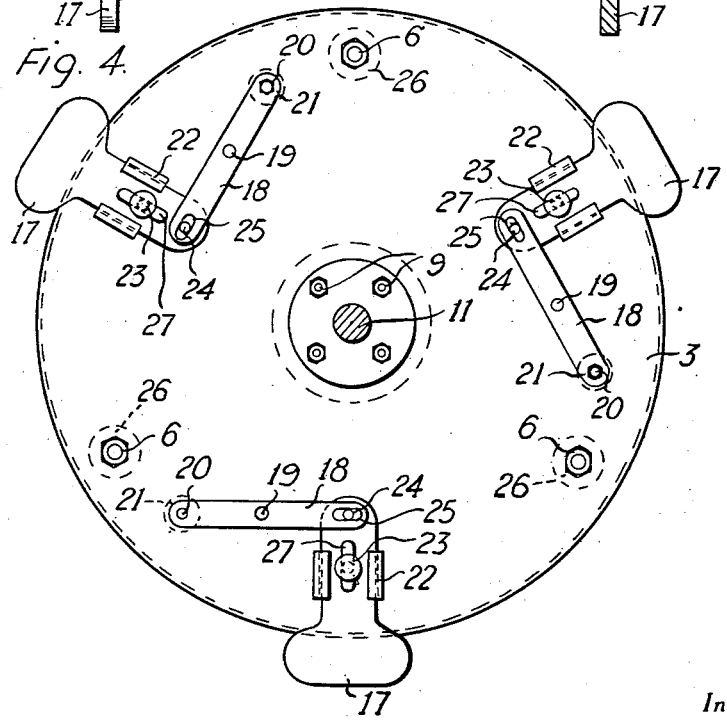
Inventors
WILLIAM BROUGH
JOSEPH SEYMOUR THOMPSON
By Toulmin & Toulmin
Attorneys

United States Patent Office 2,963,921
Patented Dec. 13, 1960

2,963,921

MEANS FOR MOUNTING A MEMBER FOR ROTATION

William Brough, 15 Grange Ave., and Joseph Seymour Thompson, 70 Curzen St., both of Derby, England Filed July 1, 1958, Ser. No. 745,861

Claims priority, application Great Britain July 5, 1957

10 Claims. (Cl. 74—573)

This invention is concerned with improvements in or relating to rotatable members and is particularly concerned with improvements in rotatable members whose dynamic balance is likely to vary thus making any substantial speed of rotation impossible.

It will be appreciated that any member may be rotated comparatively slowly but if a member is not dynamically balanced, it becomes increasingly more difficult to rotate the member at comparatively fast speeds, due to the forces set up by the dynamic out of balance. A member which is driven at a comparatively high speed and which is dynamically out of balance causes considerable vibration particularly to the bearings about which the member is rotating and to the housing and/or container of the bearings and in consequence causes excessive wear and damage to the bearings. Furthermore a tendency to displace the housing and/or container of the bearings is created.

Arrangements in which a rotating member is subject to varying loads and which member is required to be rotated at comparatively high speeds, thus encountering the problem of dynamic out of balance are well known.

One particular application of such arrangements with which this invention is concerned is in the drying of materials such as for example textile materials. The effect of centrifugal force on water retained in textile materials is well known for producing a "spin drying" effect which is applied both industrially in laundries and domestically for domestic washing machines. It is known to provide a perforated cylindrical drum into which the wet materials are placed and then to rotate the drum at a comparatively high speed, in the order of 400 to 500 r.p.m. for a comparatively short period of time, i.e. four to five minutes whereupon the materials will be found to be free of surplus moisture and slightly damp.

It is known to mount a perforated drum for rotation about a substantially vertical axis in one lower bearing and to mount that bearing for the drum in resilient means which are able to absorb the dynamic out of balance forces created. The rotation of a perforated drum about a substantially horizontal axis presents problems of dynamic out of balance which have not hitherto been solved as does a drum mounted in upper and lower bearings for rotation about a substantially vertical axis.

It will be appreciated that a drum containing a plurality of wet material changes its weight loading as the water is expelled from the material, and thus the dynamic balance of the drum varies during its rotation. Furthermore it will be appreciated that as applied to domestic and industrial apparatus a perforated drum employed for a spin drying action may be loaded with comparatively few light weight materials and may also be loaded to full capacity in which event the loading of the drum is substantially greater.

The present invention is particularly concerned with a drum which is mounted in bearings at either end of the drum for rotation about a substantially horizontal axis and provides means for automatically compensating for the dynamic out of balance caused by varying weight of the contents within the drum. The invention is also applicable to a drum rotatable about a substantially vertical axis in upper and lower bearings. The present invention is also applicable to other arrangements in which a member has to be rotated at comparatively high speeds and in which dynamic out of balance forces are likely to be created such as for example the rotation of a drum for the mixing of concrete and the rotation of drums employed in certain chemical processes. The invention is generally applicable to the rotation of a member subject to varying loadings such as for example a solid cylindrical member or a member having density which varies according to certain influences or to members which are rotated by a variable force thus creating an impetus of varying magnitude at irregular intervals.

With this and other objects in view the invention provides means for mounting a rotatable member comprising a second member rotatable in unison with the first member, and means which on rotation function to displace the first member relative to the axis of rotation of the second member so that the first member is rotated about an axis about which it is dynamically balanced.

It will be appreciated that in general a truly symmetrical member can be rotated about an axis about which it is symmetrical and it will be in dynamic and static balance. If the member is subject to certain out of balance loads about the axis, it may be brought into both dynamic and static balance by the application of compensating loads at predetermined positions on said member.

The precise determination of the amount of such compensating loads and their position is one which involves extensive calculations or in the alternative complicated and extensive experiments, both of which are inapplicable to a member whose loading varies during rotation thereof.

The present invention provides for movement of the axis about which the member is rotated to ensure so far as possible that the member is rotated about an axis about which it is dynamically balanced.

According to the present invention the member is mounted relative to a second member with a limited amount of relative movement thus enabling the first mentioned member to move relative to a fixed axis about which the second member may be rotated. Means are provided for moving the first mentioned member relative to that axis according to the dynamic out of balance forces created during rotation which means automatically move the first mentioned member until it is rotated about an axis about which it is dynamically balanced.

More specifically and as applied to apparatus for the spin drying of materials the first mentioned member is in the form of a perforated drum for receiving the wet materials and the second member comprises a pair of plates at either end of the drum and connected by tie rods which extend through enlarged apertures in the end caps of the drum, thus enabling the drum to float relative to the end plates. The plates are provided with shafts for rotation about a fixed axis which is normally substantially horizontal but the present invention is not limited to rotation about a horizontal axis.

Means are provided which move the drum relative to the axis of rotation so that the drum is rotated about an axis about which it is dynamically balanced.

In one specific embodiment, said means comprise weights mounted on the plates for movement relative thereto under the influence of centrifugal force set up upon rotation, which movement is applied by suitable connections to the drum to displace the drum until it rotates about an axis about which it is dynamically balanced.

In an alternative construction, the said means comprise fluid actuated means which move the drum relative to the axis of rotation. The out of balance forces which are set up by the drum when it is rotating about an axis about which it is not dynamically balanced being applied to service sensitive to the magnitude of the out of balance in a pressure fluid system to control pressure fluid operated pistons or the like for displacing the drum until it is rotated about an axis about which it is dynamically balanced. The same principle of operation may be applied with respect to electric actuated means, the out of balance forces created by the drum being applied to electric current control devices sensitive to mechanical forces.

Figure 2:
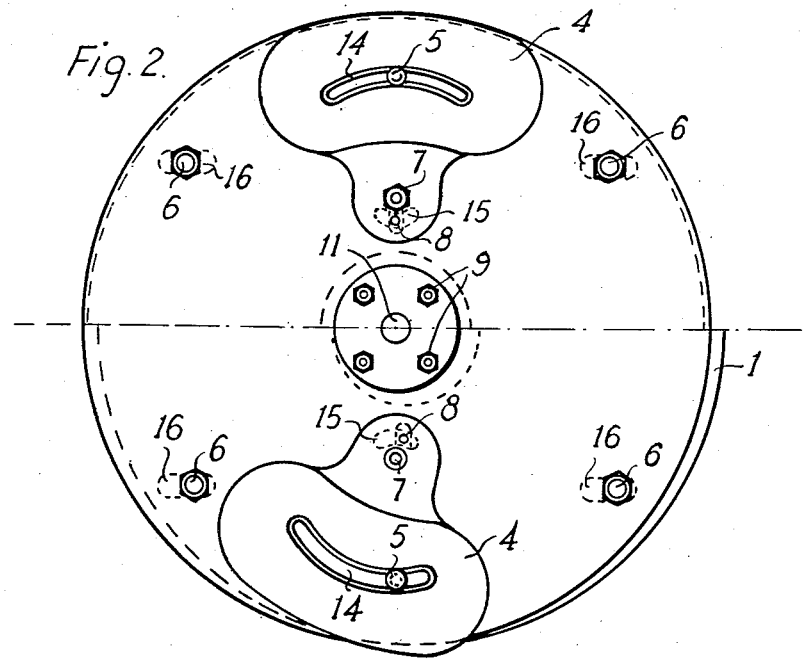

In order that the invention may be more readily understood reference will now be made to the accompanying drawings in which:

Figure 1 is a part sectional plan view of an assembly according to the present invention, Figure 2 is an end view thereof, Figure 3 is a part sectional plan view of an assembly according to an alternative construction according to the present invention, Figure 4 is a plan view thereof.

In the figures, a drum 1 which may conveniently be perforated has an end cap 2 secured thereto and is provided with four slots 16 through which extend the rods 6. The rods 6 are secured to end plates 3 and form positive spacers relative to the two plates 3, thus allowing the drum 1 to be mounted in a floating manner relative to the plates 3. The drum is able to move slightly longitudinally relative to the axis of rotation and to an extent limited by the extent of the slots 16 sideways relative to the axis of rotation.

Weights 4 are mounted about a pin 7 on the end plates 3 and their movement is limited by a slot 14 formed in the weights in which slides a pin 5 secured to the plates 3.

A further pin 8 on the other side of the fulcrum pin 7 extends through a slot 15 in the plates 3 and is secured to the end cap 2 of the drum 1. A stub axle 11 is secured to a flange 10 bolted to the end plates 3 by bolts 9. Conveniently the stub axle 11 is rotatable in bearings 12. Access to the interior of the drum 1 may be obtained through a hinged part 13.

In use and with specific reference to a spin drying action for wet clothes, the clothes are inserted into the drum 1 and the hinged part 13 closed. The assembly is set in motion to rotate about the axles 11. If the drum is dynamically out of balance the weights 4 will move about the pins 7 and will carry the pins 8 in the arcuate slots 15 and will in consequence displace the drum 1 along the slots 16 so as to displace the drum 1 relative to the axis about which it is rotating, so that it rotates about an axis about which it is dynamically balanced. Figure 2 illustrates diagrammatically how the drum 1 is displaced about the slots 16.

In Figures 3 and 4 three weights 17 are mounted on the end plates 3 for radial movement thereto by a pin 23 extending through a slot 27 formed in said weights 17. The weights 17 are connected by a pin 24 engaging in a slot 25 formed in a link 18 pivoted at 19 relative to the plate 3 and carrying the pin 20 which extends through an aperture 21 formed in the plate 3. The pin 20 engages in an aperture formed in the end cap 2 of the drum 1.

Three tie rods 6 are provided connecting the plates 3 together which tie rods extend through an aperture 26 in the end caps 2 of the drum 1 of greater cross-sectional area than that of the tie rods 6, thus enabling the drum to have limited movement in all directions relative to the axis of rotation of the plates 3. As the assembly rotates, the weights 17 move, are acted on by centrifugal force and if the drum is dynamically balanced about its symmetrical axis then the force applied by the three weights 17 through the links 18 will be equal and opposite and thus no movement of the drum will take place. If, however, the drum is being rotated about an axis about which it is not dynamically balanced there will be out of balance forces created thus enabling one or more of the weights 17 to move radially outwards and thus to displace the drum until it is rotated about an axis about which it is dynamically balanced.

It will be appreciated that any suitable number of weights whether they be slidably mounted relative to the plates 3 or pivoted thereto, may be provided, providing the moment of forces of the weights is equal and opposite relative to the axis of rotation. For example one weight member of predetermined weight may be arranged equal and opposite to two smaller weights disposed on the opposite end of the diameter, the sum total of their moment relative to the axis of rotation being equal to the moment applied by the first mentioned weight members. Similarly weight members of equal weight may be symmetrically disposed around the circumference of the plates 3.

Similar considerations apply if fluid actuated means or electric actuated means are employed in substitution for weights and mechanical links.

It will be appreciated that the present invention provides means for mounting a rotatable member so as to ensure that the member is rotatable about an axis about which it is substantially constantly dynamically balanced, and furthermore provides means for mounting a drum for use as a spin dryer for materials. In particular the present invention has specific application to a combined clothes washing machine and spin drying machine.

What we claim is:

1. In a mounting for a rotatable member, shaft means, means for fixedly journalling said shaft means, a second member mounted on said shaft means so as to be rotatable around a fixed axis and rotatable in unison with said rotatable member, and positively actuated means which during rotation displaces the rotatable member relative to the axis of rotation of said second member so that said rotatable member rotates on an axis about which it is dynamically balanced.

2. In a mounting for a rotatable member, shaft means, means for fixedly journalling said shaft means, a second member mounted on said shaft means so as to be rotatable around a fixed axis and rotatable in unison with said rotatable member, means interconnecting said rotatable member and said second member for providing limited relative movement therebetween, and positively actuated means which during rotation displaces the rotatable member relative to the axis of rotation of said second member so that said rotatable member rotates on an axis about which it is dynamically balanced.

3. In a mounting for a rotatable member having apertures therein, shaft means, means for fixedly journalling said shaft means, a second member mounted on said shaft means so as to be rotatable around a fixed axis and rotatable in unison with said rotatable member, and means which during rotation displaces the rotatable member relative to the axis of rotation of said second member so that said rotatable member rotates on an axis about which it is dynamically balanced, said second member having two parts of smaller cross-sectional area than said rotatable member apertures which parts extend parallel to said axis of rotation and pass through said apertures so as to provide limited relative movement between said rotatable member and said second member.

4. In a mounting for a rotatable member, shaft means, means for fixedly journalling said shaft means for rotation in a horizontal plane, a second member mounted on said shaft means so as to be rotatable around a fixed axis and rotatable in unison with said rotatable member, and positively actuated means which during rotation displaces the rotatable member relative to the axis of rotation of said second member so that said rotatable member rotates on an axis about which it is dynamically balanced.

5. In a mounting for a rotatable member which member comprises a drum having apertures in the ends thereof, shaft means, means for fixedly journalling said shaft means, a second member mounted on said shaft means so as to be rotatable around a fixed axis, said second member comprising a pair of spaced plates positioned at the ends of said drum and a plurality of tie rods interconnecting said plates and passing through said drum-end apertures whereby said rotatable member will rotate in unison with said second member but said rotatable member is capable of limited relative movement with respect to the axis of rotation of said second member, and means which during rotation displaces the rotatable member relative to the axis of rotation of said second member so that said rotatable member rotates on an axis about which it is dynamically balanced.

6. In a mounting for a rotatable member which member comprises a drum having apertures in the ends thereof, shaft means, means for fixedly journalling said shaft means, a second member mounted on said shaft means so as to be rotatable around a fixed axis, said second member comprising a pair of spaced plates positioned at the ends of said drum and a plurality of tie rods interconnecting said plates and passing through said drum-end apertures whereby said rotatable member will rotate in unison with said second member but said rotatable member is capable of limited relative movement with respect to the axis of rotation of said second member, and means which during rotation displaces the rotatable member relative to the axis of rotation of said second member so that said rotatable member rotates on an axis about which it is dynamically balanced, the said last-mentioned means comprising means sensitive to the out-of-balance forces created by the rotation of the rotatable member about an axis about which it is dynamically unbalanced so as to provide a force to displace said rotatable member whereby said rotatable member will rotate about an axis about which it is dynamically balanced.

7. In a mounting for a rotatable member which member comprises a drum having apertures in the ends thereof, shaft means, means for fixedly journalling said shaft means, a second member mounted on said shaft means so as to be rotatable around a fixed axis, said second member comprising a pair of spaced plates positioned at the ends of said drum and a plurality of tie rods interconnecting said plates and passing through said drum-end apertures whereby said rotatable member will rotate in unison with said second member but said rotatable member is capable of limited relative movement with respect to the axis of rotation of said second member, and means which during rotation displaces the rotatable member relative to the axis of rotation of said second member so that said rotatable member rotates on an axis about which it is dynamically balanced, the said last-mentioned means comprising weights mounted on said plates and connected to said drum so that said weights may move upon rotation of said plates so as to displace the drum relative to the axis of rotation according to the dynamic out-of-balance forces created.

8. In a mounting for a rotatable member as claimed in claim 7 wherein said weights are pivotally mounted upon said plates and have a mechanical connection with the said drum so that upon rotation said weights will move to displace said drum whereby the drum will be rotated about an axis about which it is dynamically balanced.

9. In a mounting for a rotatable member which member comprises a drum having apertures in the ends thereof, shaft means, means for fixedly journalling said shaft means, a second member mounted on said shaft means so as to be rotatable around a fixed axis, said second member comprising a pair of spaced plates positioned at the ends of said drum and a plurality of tie rods interconnecting said plates and passing through said drum-end apertures whereby said rotatable member will rotate in unison with said second member but said rotatable member is capable of limited relative movement with respect to the axis of rotation of said second member, means which during rotation displaces the rotatable member relative to the axis of rotation of said second member so that said rotatable member rotates on an axis about which it is dynamically balanced, the last-mentioned means comprising weights mounted on said plates and connected to said drum so that said weights may move upon rotation of said plates so as to displace the drum relative to the axis of rotation according to the dynamic out-of-balance forces created, means slidably connecting said weights to said plates whereby said weights can move radially thereon, and linkage connecting said weights and said drum to displace said drum upon rotation whereby said drum will be rotated about an axis about which it is dynamically balanced.

10. In a mounting for a rotatable member, said rotatable member comprising a perforated drum for spin-drying materials, shaft means, means for fixedly journalling said shaft means, a second member mounted on said shaft means so as to be rotatable around a fixed axis and rotatable in unison with said rotatable member, and positively actuated means which during rotation displaces the rotatable member relative to the axis of rotation of said second member so that said rotatable member rotates on an axis about which it is dynamically balanced.

References Cited in the file of this patent

UNITED STATES PATENTS

| Number | Name | Date |
|---|---|---|
| 553,811 | De Laval | Jan. 28, 1896 |
| 1,952,574 | Adams | Mar. 27, 1934 |
| 2,179,247 | Arnold | Nov. 7, 1939 |
| 2,238,989 | Bradbury | Apr. 22, 1941 |
| 2,471,217 | Johnson | May 24, 1949 |
| 2,612,418 | Krotz | Sept. 30, 1952 |